United States Patent [19]

Shimajiri et al.

[11] 4,196,501
[45] Apr. 8, 1980

[54] MACHINE TOOL

[75] Inventors: Tokiji Shimajiri, Kawasaki; Hideo Katsube, Hachioji, both of Japan

[73] Assignee: Fujitsu Fanuc Limited, Tokyo, Japan

[21] Appl. No.: 899,832

[22] Filed: Apr. 25, 1978

[30] Foreign Application Priority Data

Apr. 25, 1977 [JP] Japan .................................. 52-46799

[51] Int. Cl.² .......................................... B23Q 3/157
[52] U.S. Cl. ...................................... 29/26 A; 29/568; 409/233
[58] Field of Search .................. 29/26 A, 568; 408/35; 211/1.5; 90/11 A, 11 D; 409/233

[56] References Cited

U.S. PATENT DOCUMENTS

| 3,263,300 | 8/1966 | Schatzman et al. ................. 29/26 A |
| 3,271,853 | 9/1966 | Pfister ................................. 29/568 |
| 3,277,568 | 10/1966 | Wetzel ................................ 29/568 |
| 3,604,083 | 9/1971 | Antonietto ......................... 29/26 A |
| 4,102,035 | 7/1978 | Voglreider et al. .................. 29/568 |
| 4,103,405 | 8/1978 | Blum et al. ......................... 29/26 A |

Primary Examiner—Z. R. Bilinsky
Attorney, Agent, or Firm—Armstrong, Nikaido, Marmelstein & Kubovcik

[57] ABSTRACT

Disclosed is a machine tool which comprises a spindle head, and an automatic tool changing apparatus which comprises a tool release mechanism adapted to be operated by movement of the spindle head in the direction of axis of the spindle and a tool magazine supported in floating manner with respect to the direction of the axis of spindle. When the spindle head is axially moved away from the tool magazine with the tool in the spindle being held by the tool magazine, in order to remove the tool from the spindle the tool is released from engagement with the spindle by a release mechanism, and the tool magazine can be moved together with the spindle head until the tool has been released.

8 Claims, 11 Drawing Figures

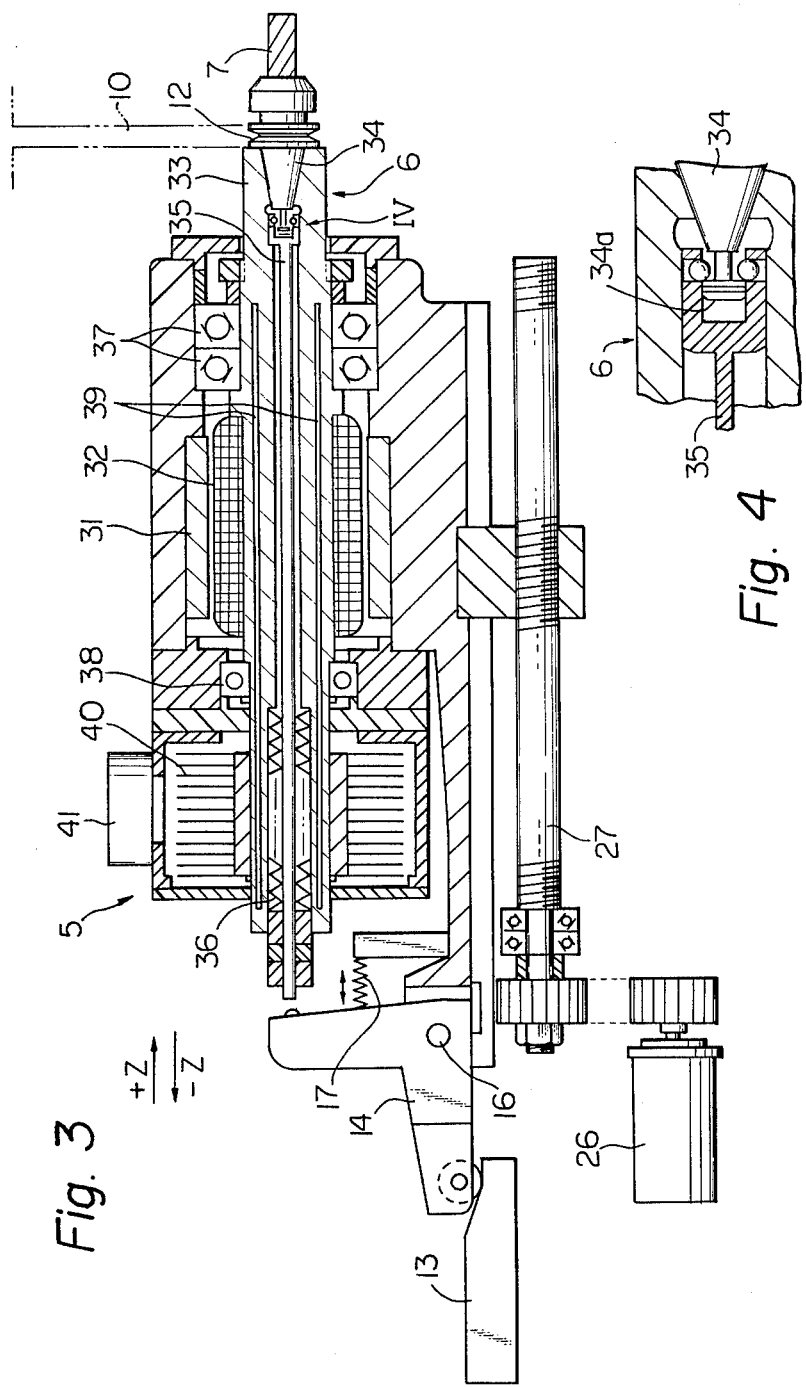

MACHINE TOOL

BACKGROUND OF THE INVENTION

1. Field of the Invention

The present invention relates to a machine tool provided with an automatic tool changing apparatus.

2. Description of the Prior Art

There is a known machine tool provided with an automatic tool changing apparatus, in which a tool magazine is mounted on a table which is movable along two axes perpendicular to each other, in a plane perpendicular to an axis of a spindle of the machine. With this known machine transfer of tools between the tool magazine and the spindle is performed by movement of the table along the axis perpendicular to the axis of the spindle and relative movement between the tool magazine and the spindle along the axis of the spindle. However, this machine tool has a disadvantage in that the area on the table useful for machining is reduced by the tool magazine mounted on the table. With respect to the changing of a tool in a machine in which feed axles are numerically controlled, there is also a drawback in that it is necessary to previously make a program of distances of movements of the respective axles necessary for the tool changing.

Another machine tool is known which is provided with a rotary tool magazine movable along an axis perpendicular to the axis of spindle. With this known machine tool the tool magazine is rotated and moved towards the spindle, so that one of tools stored in the tool magazine is coaxially aligned with the spindle, and subsequently, a relative movement between the magazine tool and the spindle along axis of the spindle is performed, so that the tool is set into the spindle. In accordance with such an arrangement, the mechanisms for rotation and movement of the tool magazine can be provided independently of the numerically controlled feed axles. However, in order to remove the tool from the spindle by moving the spindle axially away from the tool magazine with the tool being held by the tool magazine, it is necessary to release the tool from engagement with the spindle, prior to moving the spindle. That is, a mechanism securing the tool engaged with the spindle should be previously placed in a tool releasing position. For this purpose, a particular power actuator should be provided, thereby making the machine tool complicated in construction and expensive to manufacture.

SUMMARY OF THE INVENTION

It is, therefore, a primary object of the present invention to provide a new and improved machine tool provided with an automatic tool changing apparatus, from which the aforementioned disadvantage drawback are excluded.

Another specific object of the present invention is to provide a simple and inexpensive tool releasing mechanism without a particular power drive, adapted for application to an automatic tool changing apparatus of a machine tool.

In accordance with the present invention, there is provided a machine tool comprising: a spindle head supporting a spindle extending in a first direction, said spindle being provided with means for securing a tool engaged therewith; means for moving said spindle head in said first direction, and; an automatic tool changing apparatus comprising: a rotary tool magazine for storing a plurality of tools and having a supporting shaft for rotation thereof; means for moving said tool magazine in a second direction perpendicular to said first direction; means for rotating said tool magazine about the axis of said supporting shaft; said tool magazine moving means, said tool magazine rotating means and said spindle head moving means being adapted for transferring tools between said spindle and said tool magazine; tool release means adapted to be operated by movement of said spindle head for actuating said tool securing means so as to release the tool from engagement with the spindle when said spindle head is moved in said first direction away from said tool magazine with the tool in said spindle being held by said tool magazine in order to remove the tool from the spindle, and; floating support means for permitting said tool magazine holding the tool set in said spindle to be moved together with said spindle head in said first direction until the tool has been released from said spindle.

The above and other objects, features and advantages of the present invention will be more apparent from the following description of a preferred embodiment with reference to the accompanying drawings, in which:

FIG. 3 is a sectional view of a spindle head;

FIG. 4 is an enlarged sectional view of the portion "IV" in FIG. 3;

DESCRIPTION OF THE PREFERRED EMBODIMENTS

Figure 1:
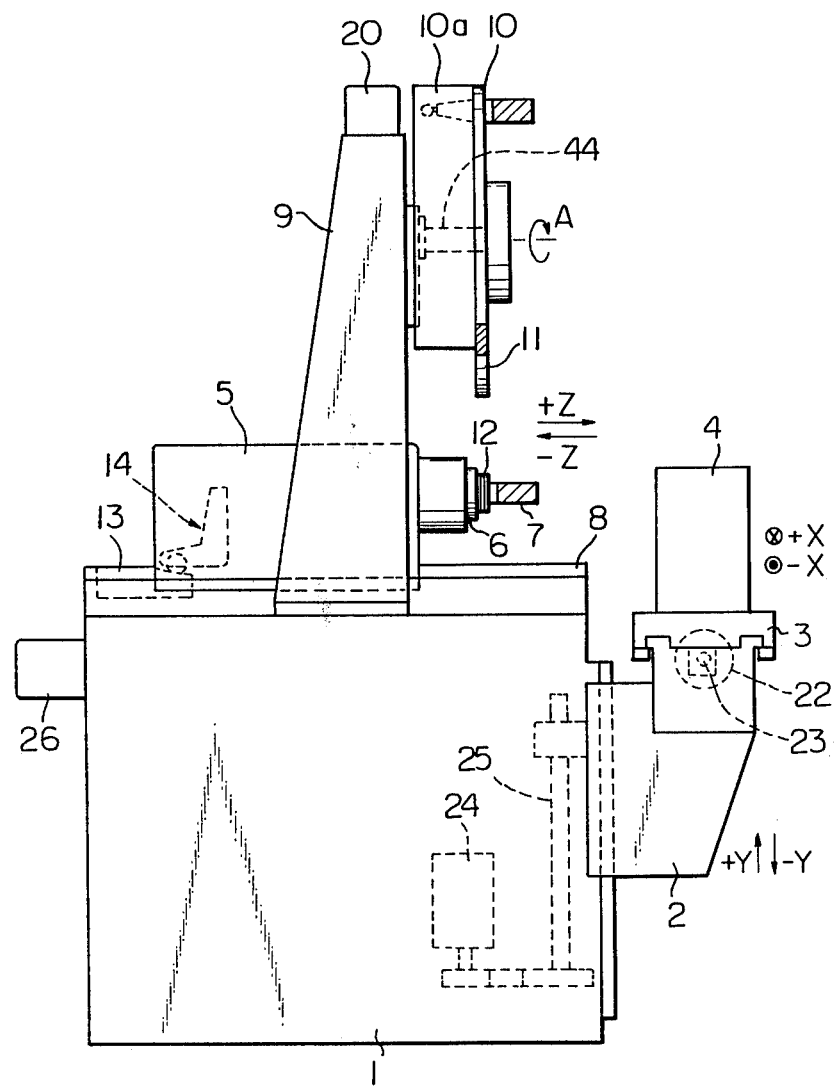
FIG. 1 is a side elevational view of a machine tool according to the present invention.

Referring to FIG. 1, a machine tool comprises a bed 1, and a knee 2 which is mounted on the bed 1 so that it may be moved in the vertical direction Y by a feed mechanism including a feed motor 24 and a lead screw 25. On the knee 2, is mounted a worktable 3 on which a piece of work 4 is secured. The worktable 3 may be moved in the horizontal direction X with respect to the knee 2 by a feed mechanism including a feed motor 22 and a lead screw 23.

On the bed 1, is mounted a spindle head 5 which supports a spindle 6 extending in the horizontal direction Z, perpendicular to the direction X. In FIG. 1, a tool 7 is set in the spindle 6. The spindle head 5 may be moved along a horizontal guide way 8 formed on the bed 1 in the direction Z by a feed mechanism including a feed motor 26 and a lead screw 27 (FIG. 3).

Also on the bed 1, is secured an upright column 9 which supports a tool magazine 10 and a tool cover 10a. As will be described in detail hereinafter, the tool magazine 10 may be moved in the vertical direction Y, perpendicular to the direction of the axis of the spindle 6, and also, may be rotated about a supporting shaft 44 in the direction of arrow A. The tool magazine 10 has a plurality of tool holding portions 11 formed at equal distances in the circumference thereof. The tool holding portion 11 is provided with a pair of detent pins 42 which are forced by springs 43 into engagement with groove 12 in the tool (FIG. 1 or 3), so that various kinds of tools can be held in the respective tool holding portions 11 with the axes of the tool parallel to the axis of the spindle 6. In FIG. 1, the lowermost tool holding portion 11 is empty and is located right above the tool 6 set in the spindle 7.

The tool changing operation in the above-described machine tool will now be explained with reference to FIGS. 2a through 2f, in which FIG. 2a corresponds to FIG. 1. The operation is performed successively through the following steps.

Figure 2A:
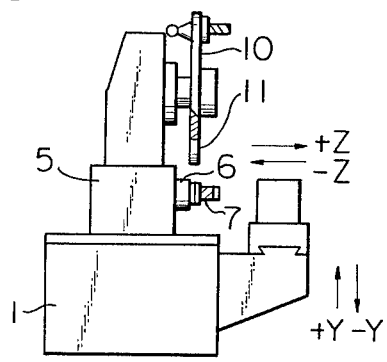
FIGS. 2a through 2f illustrate machine tools in different positions in a tool changing operation.
Figure 2B:
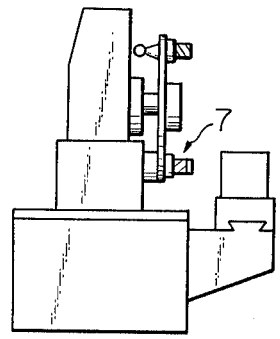

(1) The tool magazine 10 is moved downward from the position as illustrated in FIG. 2a in the direction −Y, whereby the tool 7 is held by the tool holding portion 11 (FIG. 2b).

Figure 2C:
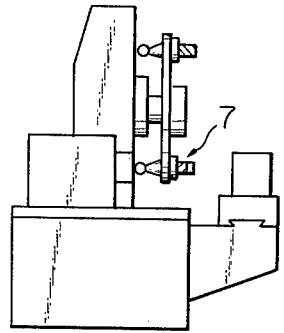

(2) The spindle head 5 is moved backward in the direction −Z, whereby the tool 7 is removed from the spindle and retained in the tool magazine 10 (FIG. 2c).

Figure 2D:
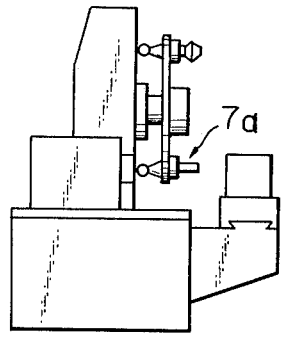

(3) The tool magazine 10 is rotated through one or a predetermined number of tool-pitches, whereby a preselected new tool 7a is positioned in coaxial alignment with the spindle 6 (FIG. 2d).

Figure 2E:
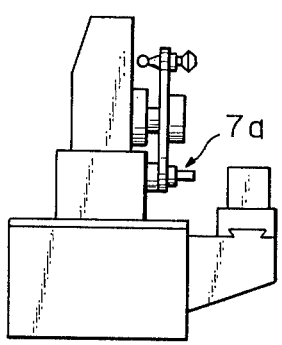
Figure 2F:
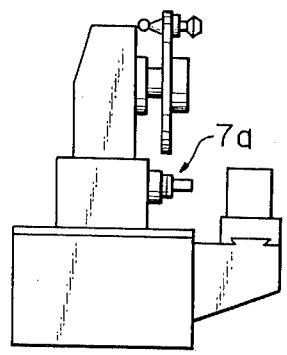

(4) The spindle head 5 is moved forward in the direction +Z, whereby the tool 7a is engaged with the spindle 6 (FIG. 2e).

(5) The tool magazine 10 is moved upward in the direction +Y, leaving the tool set in the spindle 7, whereby the tool changing operation has been completed.

Referring to FIG. 3, the spindle head 5 has a field magnet 31 secured to the inside of the body thereof, and an armature coil 32 wound on the spindle 6. These magnet 31 and coil 32 form a DC motor for driving a spindle 6, in which a armature shaft is the same member as the spindle 6. The nose of the spindle 6 is formed with a tapered bore 33 in which a tapered surface of a tool holder 34 fits. A draw bar 35 is slidably inserted into the spindle 6 and forced by dished springs 36 in the direction −Z (leftward in FIG. 3). As best illustrated in FIG. 4, the forward end of the draw bar 35 is adapted to selectively catch and release the tool by a pull stud 34a of the tool holder 34.

The operation of the draw bar 35 is performed by a cam-and-crank mechanism, which includes a plate cam 13 secured to the bed 1 and a bell crank 14 adapted to cooperate with the cam 13. The bell crank 14 is pivotally secured to the body of the spindle head 5 via a pivot 16 and is forced by a spring 17. When the spindle head 5 is moved backward in the direction −Z by the motor 26, the bell crank 14 is povotally rotated by the plate cam 13 about a pivot 16, against force of the spring 17, in the clockwise direction in FIG. 3, so as to push the rear end of the draw bar 35. Accordingly, the draw bar 35 is displaced in the direction +Z, with respect to the spindle 6, against the force of the springs 36, thereby releasing the tool holder 34. In this tool release process, the tool and the tool magazine 10. should be moved together with the spindle head 5 through a predetermined distance (that is, a stroke of the spindle head necessary for release of the tool holder 34 from the draw bar 35). For this purpose, the tool magazine 10 is mounted on the axles 44 in a floating manner, so that it may be moved in the direction Z, as described hereinafter.

In FIG. 3, there are illustrated bearings 37 and 38, heat pipes 39 provided in the spindle for cooling, radiator fins 40, and a cooling fan for the radiation fins.

Figure 5:
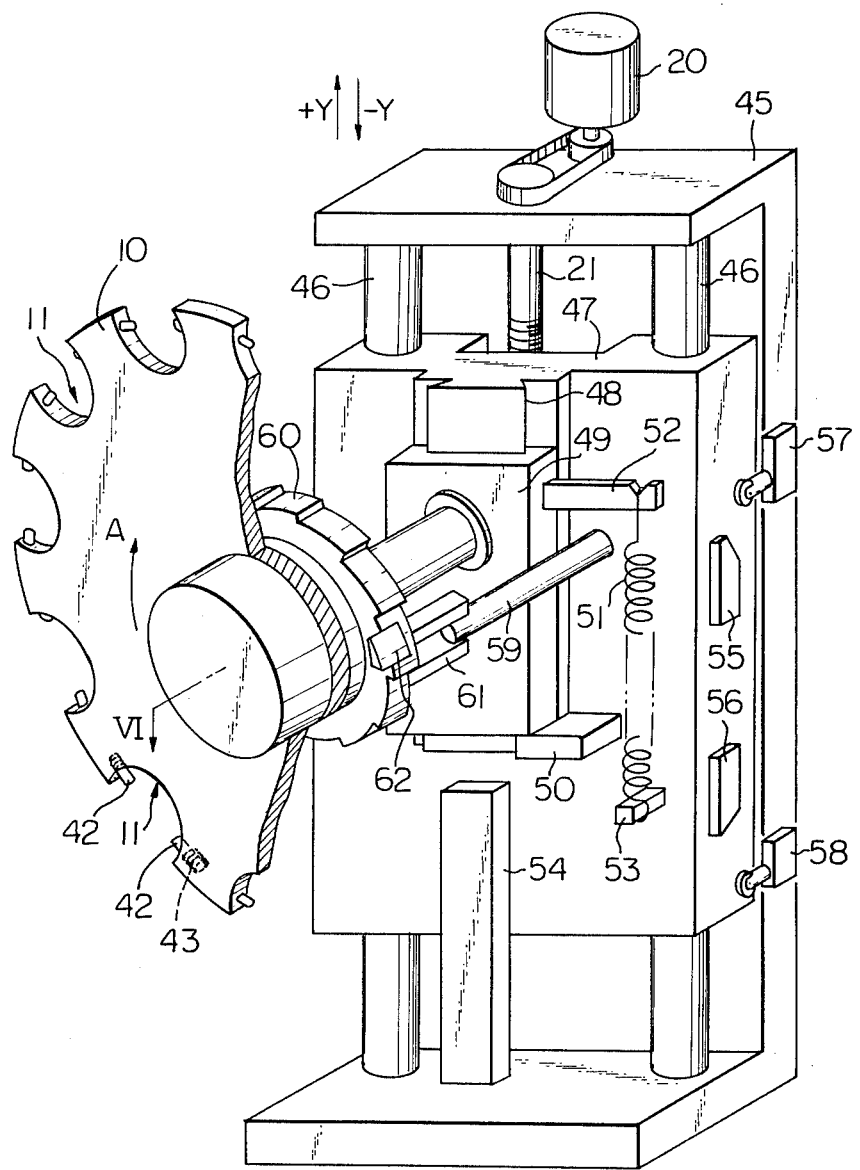
FIG. 5 is a perspective view illustrating feeding and rotating mechanisms for the tool magazine.

Mechanisms for movement and for rotation of the tool magazine will now be explained with reference to FIGS. 5 and 6. The column 9 (FIG. 1) comprises a support 45 which is provided with a pair of guide bars 46 extending in the direction Y. A carriage 47 is slidably mounted on the guide bars 46. The carriage 47 is formed with a guide way 48 in the form of dovetail tenon extending in the direction Y, on which a slide 49 is slidably mounted. The aforementioned supporting shaft 44 is secured to the slide 49. The carriage 47 also has a stop 50 secured thereto, and a spring 51 is connected between an arm 52 secured to the lower portion of the carriage 47. Accordingly, the slide 49 is normally held, under the effect of the spring 51, in a position in which its the bottom end abuts against the stop 50, as illustrated in FIG. 5.

The support 45 is also provided with a stop 54 for the slide 49. The stop 54 is so positioned that, when the slide 49 abuts against the stop 54, the tool magazine 10 is located in the position, as shown in FIGS. 2b through 2e, in which the selected tool holding portion or tool in the tool magazine is coaxially aligned with the spindle 6.

The carriage 47 is moved in the direction Y by a drive mechanism including a feed motor 20 and a lead screw 21. The range of movement of the carriage 47 is defined by a control mechanism including limit switches 57 and 58 secured to the support 45, so as to be operated by stroke end-detecting dogs 55 and 56, respectively, secured to the carriage 47.

Figure 6:
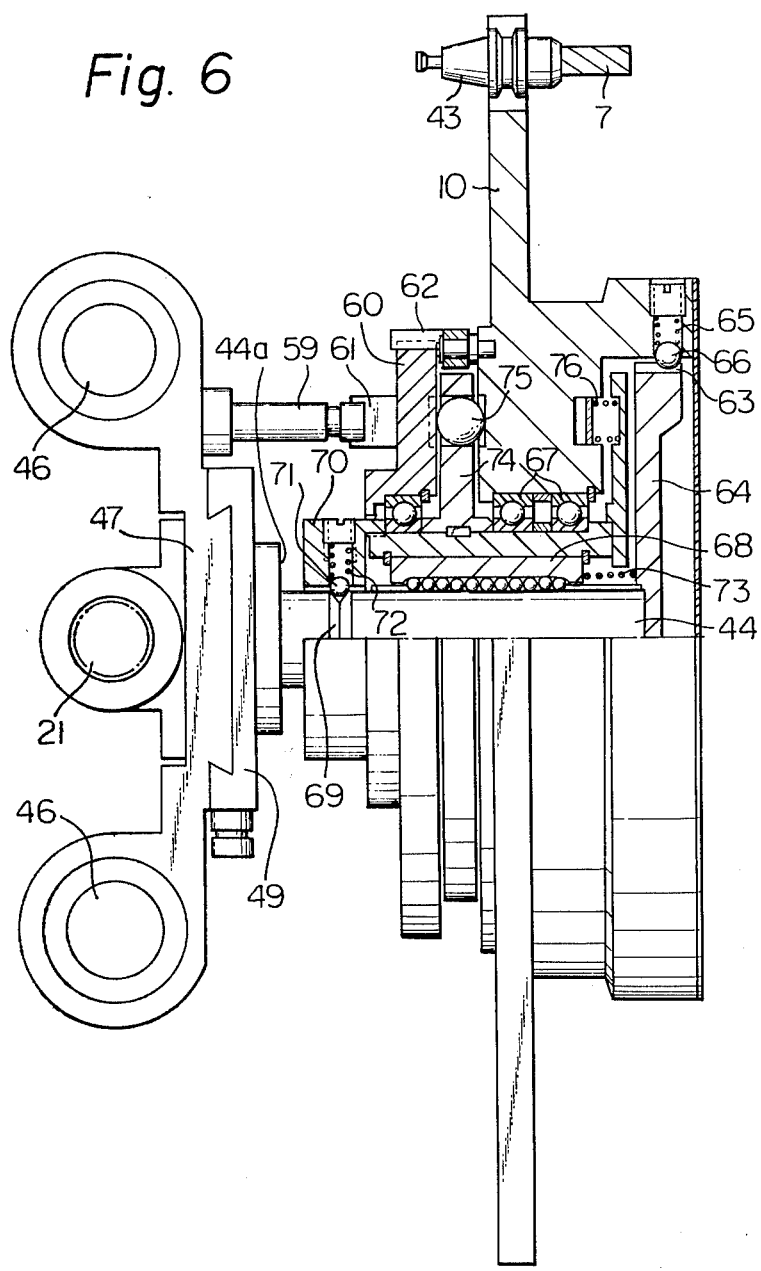
FIG. 6 is a partial sectional view taken along the line VI and FIG. 5.

As illustrated in FIG. 6, the tool magazine is rotatably mounted on the shaft 44 via ball bearings 67. The mechanism for rotation of the tool magazine comprises an arm 59, a ratchet wheel 60, a connection 61 and a pawl 62. The arm 59 is secured at its one end to the carriage 47. The ratchet wheel 60 is mounted on the shaft 44 via a ball bearing so that it may be rotated independently of the tool magazine 10. The connection 61 is secured to the side of the ratchet wheel 60, and is composed of a pair of plates between which the free end of the arm 59 is inserted. The pawl 62 is pivotally secured to the side of the tool magazine 10 and is in engagement with the ratchet wheel 60.

The mechanisms for movement and for rotation of the tool magazine operate as follows.

When the feed motor 20 is operated so as to move the carriage 47 downward in the direction −Y via the lead screw 21, the slide 49 together with the carriage is moved downward in the same direction until its bottom end abuts against the stop 54, in which the slide 49 is prevented from subsequent movement in the direction −Y. In this process, it is possible to cause either the selected tool holding portion 11 of the tool magazine 10 to engage the tool set in the spindle or the selected tool stored in the tool magazine to be coaxially aligned with the spindle.

When the feed motor 20 is subsequently operated in the same direction of rotation, only the carriage 47 is further moved downward in the direction −Y against the force of spring 51, with the slide 49 being kept rest in position. Then, the arm 59 causes, via the connector 61, the ratchet wheel 60 to rotate through a predetermined angle in the direction of arrow A in FIG. 5. This rotation of the ratchet wheel 60 causes, via the pawl 62 engaged therewith, the tool magazine 10 to rotate in the direction of arrow A. When the limit switch 58 is actuated by the dog 56, the motor 20 stops. In this way, the tool magazine 10 is rotated through one tool-pitch so that the next selected tool is brought into coaxial alignment with the spindle 6.

After the spindle has been engaged with the new tool by the forward movement of the spindle head, the motor 20 is operated in the reverse direction of rotation, whereby the carriage 47 is moved upward in the direction +Y until the stop 50 abuts against the bottom end of the slide 49. In this process, the arm 59 and the connection 61 cause the ratchet wheel 60 to rotate backward in the direction opposite to that of arrow A, whereby the pawl 62 is brought into engagement with the one tool pitch-advanced ratchet of the ratchet wheel 60. After the stop 50 has abutted against the slide 49, the carriage 47 together with the slide 49 is moved upward in the direction +Y until the limit switch 57 is actuated by the dog 55 and, thus, the motor 20 stops. In this process, the tool magazine 10 leaves the tool set in the spindle.

As illustrated in FIG. 6, an index plate 64 is secured to the free end of the supporting shaft 44. This index plate is formed with axial recesses 63 in the circumference thereof, at the same pitch as the tool pitch, in which a steel detent ball 66 forced by a spring 65 fits. Accordingly, when being rotated by the ratchet wheel 60 via the pawl 62, the tool magazine 10 is located precisely in a predetermined position.

The tool magazine 10 also is supported on the supporting shaft 44, via a ball-spline 68, in a floating manner, so that it is axially movable in the direction Z. The ball-spline 68 is, with respect to the shaft 44, free to be axially moved, but prevented from being rotated. The shaft 44 also is formed with a circumferential groove 69, and a bush 70 is provided with a steel detent ball 71 forced by a spring 72. Furthermore, a spring 73 is interposed between the ball-spline 68 and the index plate 64, so that the tool magazine 10 is normally in the axial position in which the detent ball 71 engages the groove 69.

In the process in which the spindle head 5 is moved backward away from the tool magazine with the tool in the spindle being held by the tool magazine, the tool magazine 10 is pulled leftward in FIG. 6 until the draw bar 35 has been operated by the crank 14 to release the tool. In this condition, the detent ball 71 goes out of the groove 69 and onto the peripheral surface of the shaft 44, thereby permitting the tool magazine to move in the axial direction until the bush 70 abuts against the base portion 44a of the shaft 44. In the subsequent process, in which the spindle head 5 is returned toward the tool magazine to bring the spindle into engagement with the new tool in the tool magazine, the tool magazine 10 is pushed back rightward in FIG. 6 and the detent ball 71 engages the groove 69 again.

In FIG. 6, to the ball spline 68 is secured a disk 74 which is disposed between the tool magazine 10 and the ratchet wheel 60. The disk 74 carries a steel ball 75 having a diameter which slightly larger than thickness thereof. The ball 75, together with circumferential grooves formed in the opposite sides of the tool magazine 10 and of the ratchet wheel 60, forms a known type of anti-overrun mechanism. Reference numeral 76 indicates a brake mechanism for the tool magazine.

As will be apparent from the foregoing description, the movement of the tool spindle effects releasing of the tool via the cam-and-crank mechanism, thereby eliminating the necessity of a release operation prior to the movement of the spindle head and, accordingly, a particular power actuator therefore.

The machine tool according to the present invention is relatively simple in construction and also inexpensive to manufacture.

The invention has been described in detail with particular reference to preferred embodiment thereof, but it will be understood that variations and modifications can be effected within the spirit and scope of the invention.

What we claim is:

1. A machine tool comprising:
   a spindle head supporting a spindle extending in a first direction, said spindle having means for securing a tool in engagement therewith;
   means for moving said spindle head in said first direction, and;
   an automatic tool changing apparatus comprising;
   a rotary tool magazine for holding a plurality of tools and having a supporting shaft for the rotation thereof;
   means for moving said tool magazine in a second direction perpendicular to said first direction;
   means for rotating said tool magazine about the axis of said supporting shaft;
   wherein said tool magazine moving means, said tool magazine rotating means and said spindle head moving means are operably related for transferring tools between said spindle and said tool magazine;
   tool release means operably coupled to said spindle head for actuating said tool securing means to release the tool from engagement with the spindle when said spindle head is moved in said first direction to separate it from said tool magazine, the tool in said spindle being held by said tool magazine for removing the tool from the spindle, and;
   floating support means for permitting said tool magazine to be moved together with said spindle head in said first direction when a tool is held in said tool magazine and is set in said spindle, until the tool has been released from said spindle.

2. A machine tool according to claim 1 wherein said tool securing means comprises a draw bar extending in said first direction and movable axially between tool securing position and tool releasing position.

3. A machine tool according to claim 1, wherein said tool release means comprises a cam mechanism comprising a cam member secured to a fixed member and a cam follower mounted on said spindle head for cooperating with said cam member so as to operate said tool securing means.

4. A machine tool according to claim 3, wherein said cam member is a plate cam, and said cam follower is a bell crank pivotally secured to the spindle head, said bell crank having two arms, one of which cooperates with said plate cam and the other of which cooperates with said tool securing means.

5. A machine tool according to claim 1, wherein said floating support means comprises bearing means for permitting said tool magazine to be moved along the axis of said supporting shaft but preventing it from being rotated about said axis of said supporting shaft, detent means for normally holding said tool magazine in a predetermined axial position, and stop means for limiting the axial movement of the tool magazine.

6. A machine tool according to claim 5, wherein said bearing means comprises a ball-spline.

7. A machine tool according to claim 5, wherein said detent means comprises a groove formed in said supporting shaft, and a spring-loaded detent member secured to said tool magazine and adapted to fit in said groove.

8. A machine tool according to claim 1, wherein said tool magazine moving means comprises a carriage movable in said second direction, a slide mounted on said carriage and slidable with respect to said carriage in said second direction, said supporting shaft being secured to said slide, and means for elastically biasing said slide into a predetermined position on said carriage, and wherein said tool magazine rotating means comprises a stop for preventing movement of said slide in the second direction in the last part of the movement of said carriage, and a linear motion-rotation convertor mechanism for effecting rotation of said tool magazine by a relative movement between said corriage and said slide in said second direction.

* * * * *